(12) United States Patent
Lobregt et al.

(10) Patent No.: US 9,092,902 B2
(45) Date of Patent: Jul. 28, 2015

(54) VISUALIZATION OF A RENDERED MULTI-DIMENSIONAL DATASET

(75) Inventors: Steven Lobregt, Eindhoven (NL);
Hubrecht Lambertus Tjalling De Bliek, Eindhoven (NL); Cornelis Pieter Visser, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1231 days.

(21) Appl. No.: 11/718,011

(22) PCT Filed: Oct. 28, 2005

(86) PCT No.: PCT/IB2005/053526
§ 371 (c)(1),
(2), (4) Date: Apr. 26, 2007

(87) PCT Pub. No.: WO2006/048802
PCT Pub. Date: May 11, 2006

(65) Prior Publication Data
US 2009/0141018 A1   Jun. 4, 2009

(30) Foreign Application Priority Data
Nov. 1, 2004   (EP) .................................... 04105440

(51) Int. Cl.
*G09G 5/377* (2006.01)
*G06T 15/08* (2011.01)
*G06T 15/50* (2011.01)

(52) U.S. Cl.
CPC ............... *G06T 15/08* (2013.01); *G06T 15/503* (2013.01)

(58) Field of Classification Search
USPC ......................................... 345/619, 424, 419
See application file for complete search history.

(56) References Cited

U.S. PATENT DOCUMENTS

| | | | |
|---|---|---|---|
| 5,381,518 A | 1/1995 | Drebin et al. | |
| 6,573,893 B1 * | 6/2003 | Naqvi et al. | 345/424 |
| 7,447,343 B2 * | 11/2008 | Barfuss et al. | 382/128 |
| 2003/0234781 A1 | 12/2003 | Laidlaw | |
| 2008/0259079 A1 * | 10/2008 | Boxman et al. | 345/424 |
| 2009/0063118 A1 * | 3/2009 | Dachille et al. | 703/11 |
| 2009/0135175 A1 * | 5/2009 | Lobregt et al. | 345/419 |

FOREIGN PATENT DOCUMENTS

| | | |
|---|---|---|
| DE | 10052540 A1 | 5/2002 |
| JP | 2002140720 A | 5/2002 |

OTHER PUBLICATIONS

Multidimensional transfer functions for interactive volume rendering Kniss, J.; Kindlmann, G.; Hansen, C.; Visualization and Computer Graphics, IEEE Transactions on vol. 8 , Issue: 3, 2002.*

(Continued)

*Primary Examiner* — Javid A Amini (57) ABSTRACT

A method of visualization of a multi-dimensional dataset of data-elements involves a rendering process in which a display-value and an opacity value are assigned to individual data-elements. One or several control sets are defined comprising respective datavalues, display-values and opacity values related according to the transfer function and for individual control set(s) the opacity value is adjustable independently of the opacity values of other control set(s). The individually and independently adjustable control sets enable the user to adjust the transfer function in a very intuitive way.

20 Claims, 5 Drawing Sheets

(56) References Cited

OTHER PUBLICATIONS

Development of an intuitive graphical user interface for volume rendering of multidetector CT data H. Shin a, B. King b, M. Galanski a and H. K. Matthies b;International Congress Series vol. 1256, Jun. 2003, pp. 265-269 CARS 2003. Computer Assisted Radiology and Surgery. Proceedings of the 17th International Congress and Exhibition.*

Andreas H. Konig, Edurad M. Groller, Mastering Transfer Function Specification by using VolumePro Technology, 1999.*

Botha et al "New Technique for Transfer Function Specification in Direct Volume Rendering using Real-Time Visual Feedback" Medical Imaging 2002.

Kniss et al "Interactive Volume rendering using Multi-Dimensional Transfer Functions and Direct Manipulation Widgets", Scientific Computing and Imaging Institute.

Volview Users 2.0 Guide: Passage Appearance, 2003 pp. 35-39.

Hohne, K. et al, "Shading 3D-images from CT using gray-level gradients", IEEE TMI, Mar. 1986.

Drebin, R. et al., "Volume Rendering", Computer Graphics, SIGGRAPH88.

Levoy, M., "Display of Surfaces from Volume Data", IEEE CG&A, May 1988.

* cited by examiner

VISUALIZATION OF A RENDERED MULTI-DIMENSIONAL DATASET

The invention pertains to visualization of a rendered multi-dimensional dataset.

In general multi-dimensional datasets are built-up from individual data-elements (often termed pixels or voxels) that assign data-values to positions in a multi-dimensional geometrical space, notably a volume. Typically data-values concern values of physical quantities, such as density, local magnetization, flow velocity, temperature etc. Usually the multi-dimensional geometrical space is a three-dimensional volume or a two-dimensional surface or plane. One of the dimensions of the multi-dimensional geometrical space may be time, that is multi-dimensional datasets include datasets over 3D+time or 2D+time.

To visualize such a multi-dimensional dataset on an essentially two-dimensional display screen generally a rendering process is applied. Such a rendering process involves the assignment to the data-element of a display-value, typically a color value or a grey value, as well as an opacity value. The opacity value of a data-element represents the way that individual data-element influences the visualization of other data-elements on the basis of their relative positions. The display-value of a data-element represents the way the data-element is visualized in itself.

A method of visualization a multi-dimensional dataset is known from the German patent application DE 100 52 540.

The known visualization concerns a three-dimensional dataset of grey values to which volume rendering is applied. The volume rendering involves a transfer function that assigns to each grey value an RGBA-value that has a transparency value (A) and a mixture of red(R), green(G) and blue(B). The known transfer function assigns transparency values to the grey values of the three-dimensional dataset according to a graph that has the shape of several trapezia (as shown in FIG. 3 of the cited German patent application) The transfer function is adjusted on the basis of a histogram of the grey values of the three-dimensional dataset. The transfer function is adjusted by setting the corners and height of the trapezia, in this way the transparency value is controlled. For each part of the transfer function relating to a particular trapezium color and brightness are assigned to the grey values.

An object of the invention is to provide a method of visualization in which the way the display-values and the opacity values are assigned is adjusted in a more user friendly manner.

This object is achieved by the method of visualization of the invention in which individual data-elements assign a data-value to a position in a multi-dimensional geometrical space, and
the visualization includes
a rendering process in which a display-value and an opacity value are assigned to individual data-elements of the multi-dimensional dataset and according to a transfer function that induces a relationship between data-values and opacity and/or display-values and wherein
one or several control sets are defined comprising respective data-values, display-values and/or opacity values related according to the transfer function and
for individual control set(s) the display-value and/or the opacity value is adjustable independently of the display-value and/or the opacity values of other control set(s).

The transfer function assigns the opacity value and/or the display-value to individual data-values of the multi-dimensional dataset. The way the rendered multi-dimensional dataset is displayed is done on the basis of the opacity value and display-value. The display-value assigned to a data-value determines the colour or grey value used to display the voxel at issue on the display. The display-value enables to visually distinguish structures within the volume, provide insight in relationships between structures within then volume, or to indicate or emphasize the presence of specific data-values. Often the data-value is a scalar quantity such as density, temperature etc. display-value. The opacity value determines the apparent amount of absorption the voxel at issue has and which influences the brightness used to display other voxels in dependence of the relative location of the other voxels and the line of sight that is used in the rendering. The transfer function determines the appearance of the rendered multi-dimensional dataset shown on the display screen. According to the invention, control sets are defined that specify related sets of opacity value and/or display-value and data-value. In fact the control sets may be viewed as points on the graph of the transfer function. The control sets can be individually adjusted which causes the transfer function to be changed. The changes of the transfer function are effected by adjusting individual control sets where only the currently adjusted control set is changed and the other control set remain at their already set values.

On the basis of the set control sets the transfer function is defined to assign display-values and or opacity values to the data-values of the multi-dimensional dataset. For data-values that are not part of one of the adjustable control sets the transfer function can be defined by any interpolation scheme. For example simple line segments can be used to connect the control sets to build up the graph of the transfer function, this simple interpolation scheme leads to very good results.

The individually and independently adjustable control sets enable the user to adjust the transfer function in a very intuitive way. Notably, the transfer function is only changed in the vicinity of the control set being adjusted and inadvertent other changes to the transfer function for data-values more remote from the control set being adjusted are avoided.

These and other aspects of the invention will be further elaborated with reference to the embodiments defined in the dependent Claims.

In a preferred implementation of the method of visualization non-overlapping ranges of data-values are predetermined. These non-overlapping ranges may be selected by the user. The control sets are positioned within the individual non-overlapping ranges. These non-overlapping ranges can be adjacent or strictly disjoint. Adjusting a control set mainly influences the transfer function for the range of data-values of the control set at issue. Notably, when a simple interpolation limited to neighboring control sets is employed, then adjustment of one control set only affects the transfer function in the range of the control set at issue and in the adjacent ranges. Hence, changes to the transfer function and accordingly to the visualization of the multi-dimensional dataset are easily controlled and are quite intuitive.

According to another aspect of the invention there are display-values set at the boundaries of the non-overlapping ranges of data-values. This provides additional rather intuitive control of the display-values. For example, setting equal display-values for a particular range of data-values, leads to the display-value being constant over that range and any control sets in that range have that constant display-value.

Further options to adjust the transfer function in a more refined way are made available by adding and/or deleting control sets. In this way the transfer function can be adapted to the content of the multi-dimensional dataset to which the visualization is applied.

The invention further relates to a workstation which has the function to visualize a multi-dimensional dataset. To this end the workstation has an input to receive multi-dimensional dataset, a processor to performer the visualization process and a display screen on which the result of the visualization process is shown. The workstation of the invention is defined in Claim 5. The workstation of the invention is enabled to perform the visualization of the invention and accordingly allows the user to adjust the transfer function of the visualization in a more intuitive and better controlled way. The invention also relates to a computer programme that can be installed in the processor of a e.g. general purpose workstation. The computer programme of the invention is defined in Claim 6. When the computer programme of the invention is installed in the processor of the workstation, then the workstation is enabled to perform the visualization of the invention and accordingly allows the user to adjust the transfer function of the visualization in a more intuitive and better controlled way.

These and other aspects of the invention will be elucidated with reference to the embodiments described hereinafter and with reference to the accompanying drawing wherein FIG. 3 shows zoom-in for accurate definition of colors and opacity and FIG. 4 shows a) an example of original voxel data (cross-section), and b) the resulting rendered image

The method of visualization of the invention defines colors at the exact voxel values where the user want them to be. Colors are interpolated between defined positions that represent the control sets. A voxel value range (segment) with constant color throughout this range can be realized by setting equal colors at the borders of the intended range.

Figure 1:
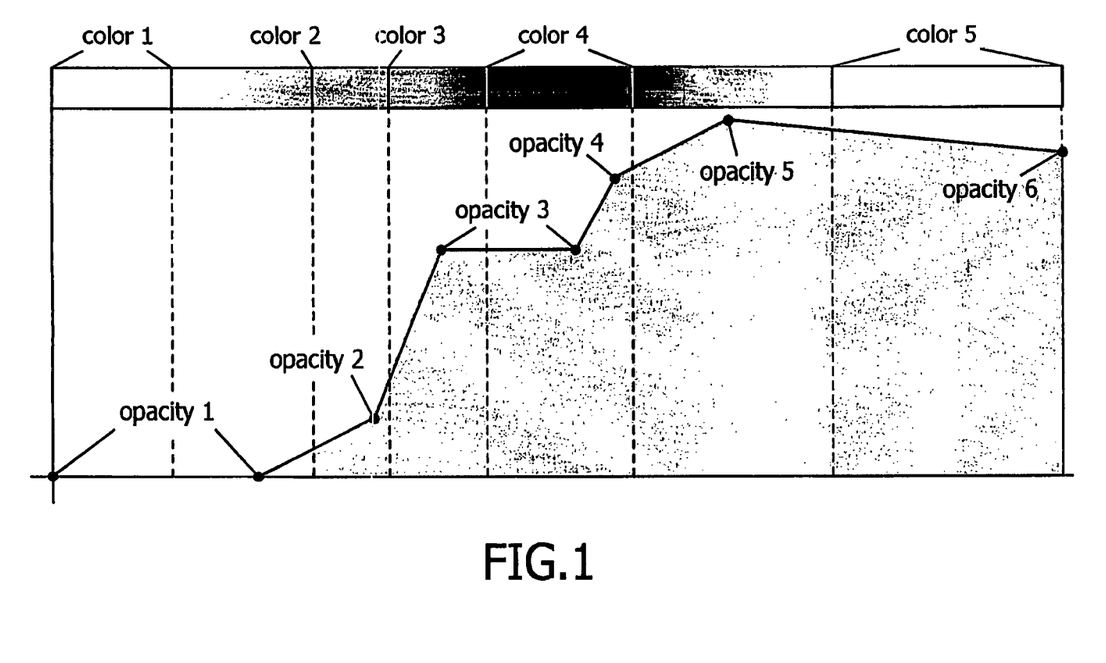
FIG. 1 shows a proposed approach for flexible and simple definition of color and opacity map that represents the transfer function

Opacities are defined in exactly the same way as colors. Colors and opacities are completely independent of each other. FIG. 1 shows an example of graph of the transfer function (TF) in the form a color and opacity map including three segments with constant color and two segments with constant opacity.

A color which is set at a certain voxel value or for a certain range of voxel values will not change when an adjacent color value or its related voxel value is modified. The same goes for assigned opacity values. It is therefore assured that once a color or opacity is assigned to a voxel value, it will not change unless it is itself deliberately modified by the user.

The number of voxel values for which a color or an opacity is defined is free to choose for the user. Definition points the correspond to the control sets, for color or opacity can be simply added or deleted.

The fact that color and opacity are independent of each other gives the advantage that they both can be modified without affecting the other. For instance: a tissue type (voxel value range) can thus be given a certain color, while the translucency (opacity) in the rendered image can still be varied without changing its color. The approach of the invention is simple and offers maximum flexibility.

The transfer function (TF) is defined in a UI window, which displays the voxel value histogram as an overlay on a colored background, which represents the defined colors. In our implementation, the histogram is shown as a grey translucent overlay, while the color values are shown over the complete height of the image in the background, so that the defined colors are clearly visible, independent of the height or the presence of the histogram.

The TF can be defined from scratch or it can be loaded from a storage as a default TF or a previously created one.

The positions where the colors are defined along the horizontal voxel value axis are indicated by vertical indicator lines in the strip along the lower part of the image. The defined opacity map is shown as a graphic overlay in the form of a polyline, where the nodes of this polyline represent the defined voxel value/opacity combinations. The horizontal position represents the voxel value, while the vertical position of the nodes represents the opacity for that voxel value. See FIG. 2.

Modifying the voxel value for which a color is defined is done by simply dragging the corresponding vertical line to another horizontal position. Modifying the color, which is assigned to a voxel value, is done by selecting the corresponding line, after which a color selection panel is popped up. Modifying a defined combination of voxel value and opacity is done by selecting the corresponding node of the opacity representing polyline and dragging it to another horizontal and/or vertical position. Using simple mouse button and keyboard combinations, new combinations of voxel value and color or opacity can be added or existing combinations deleted.

Figure 3:
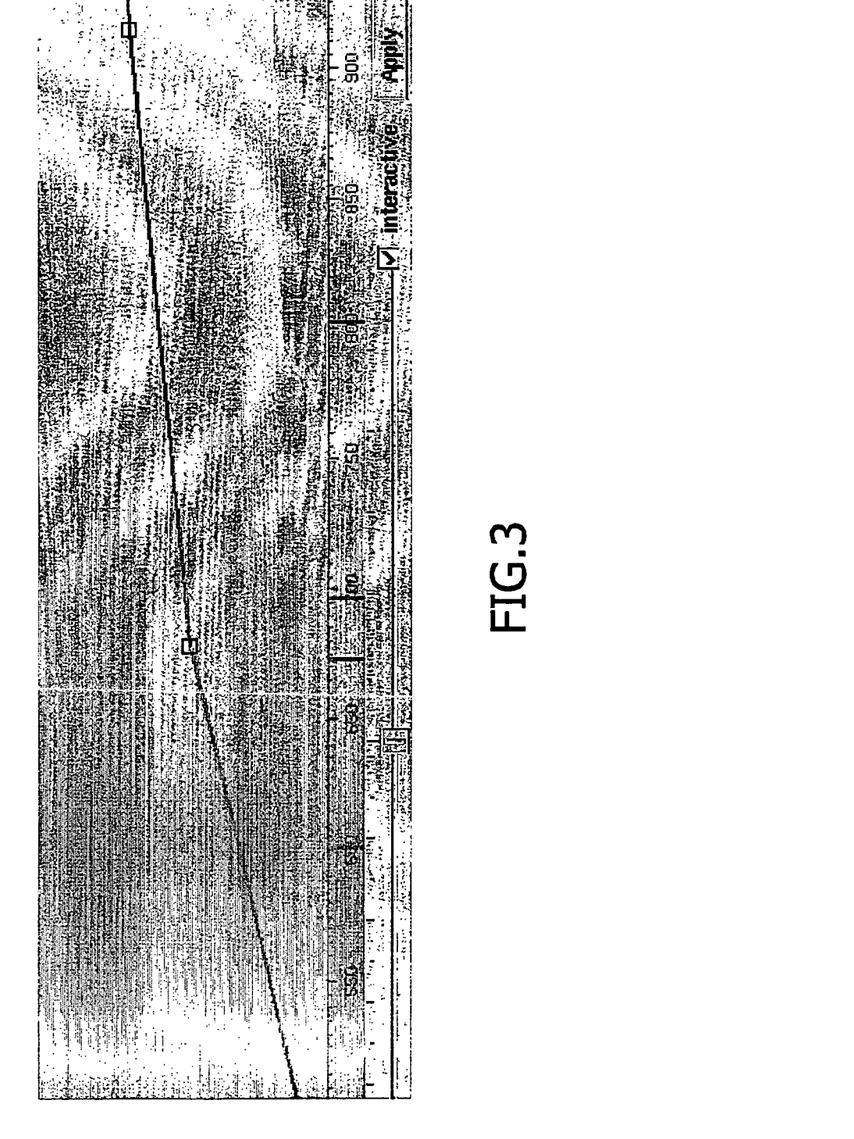

Additional functionality which is currently included in a prototype implementation of the proposed method to increase user friendliness and ease of use, include translation and stretching (zoom in horizontal direction) of the color or opacity map relative to the histogram, and translation/stretching of the combination of histogram and complete TF for better visibility of details. See FIG. 3.

The visualization of coronary arteries directly from MR, is an example where the proposed method can be applied. However, it should be noted that the method is applicable to any situation where direct volume rendering (DVR) is used for visualization.

Figure 2:
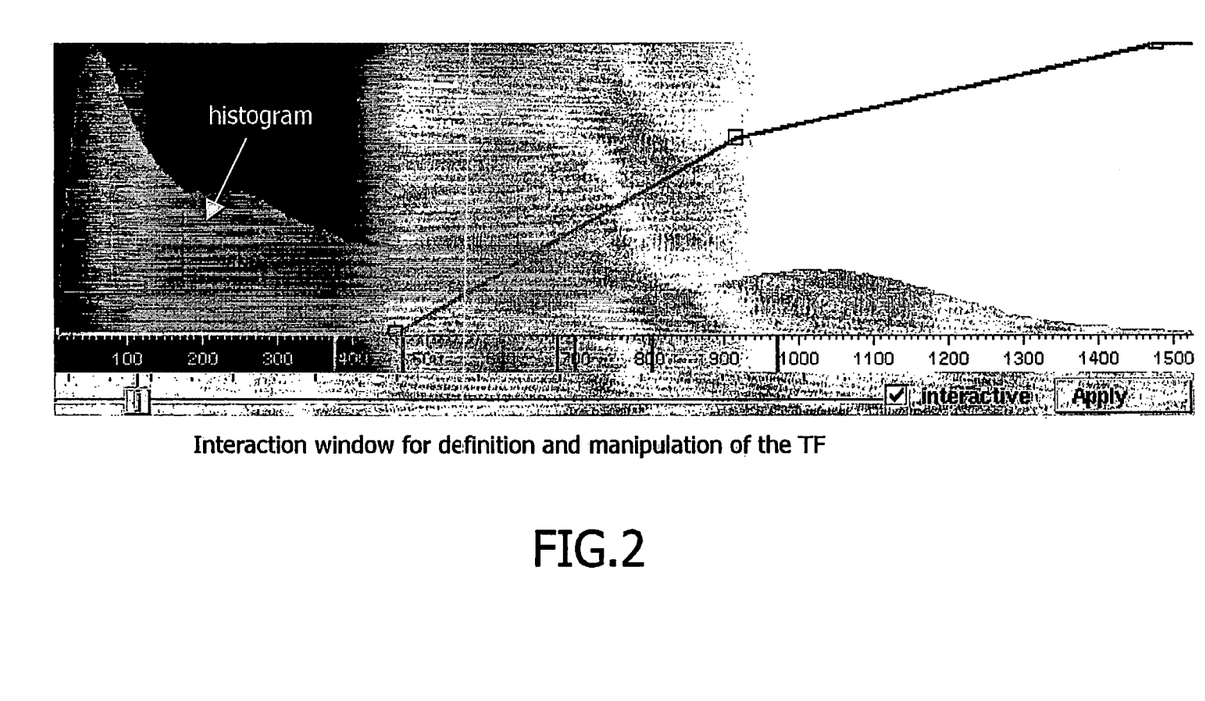
FIG. 2 shows an interaction window for definition and manipulation of the transfer function
Figure 4A:
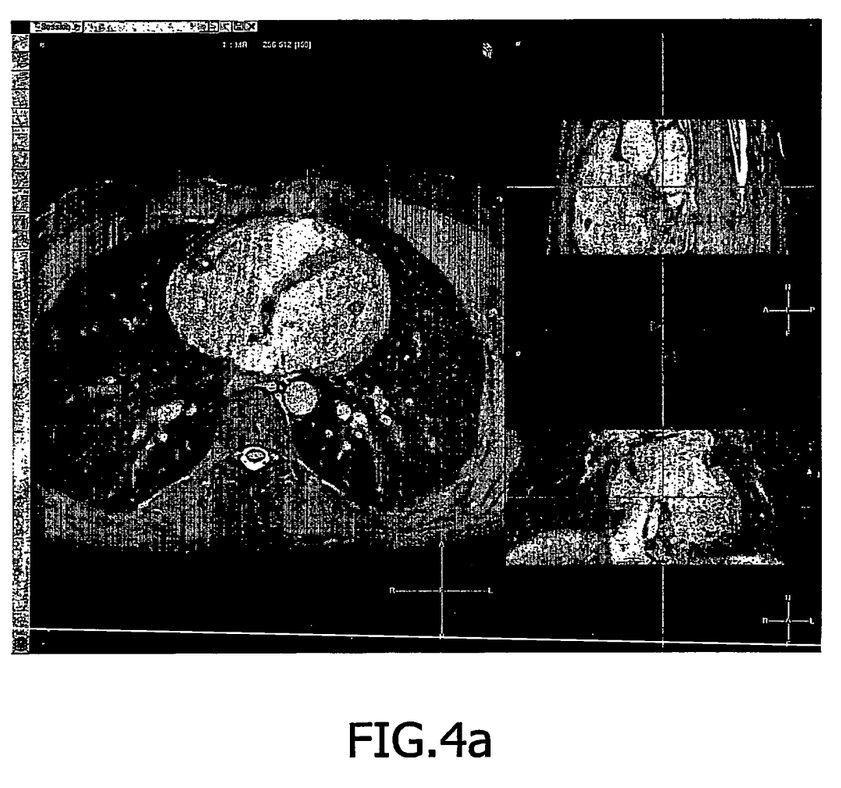
Figure 4B:
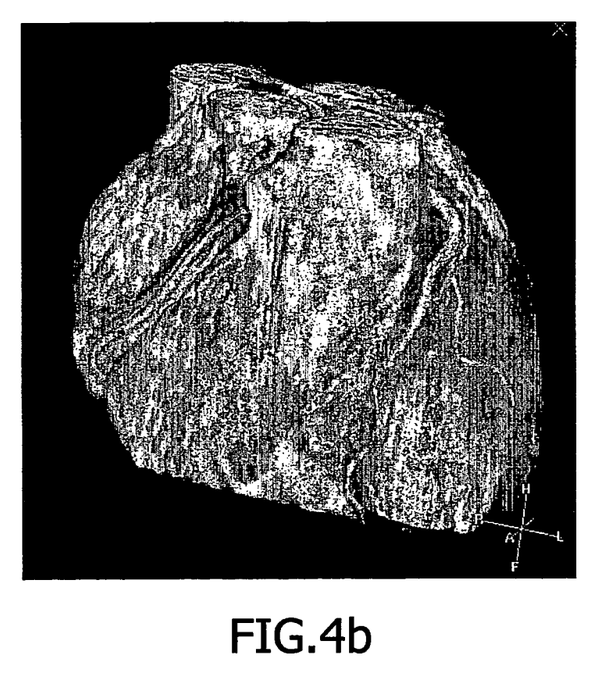

FIG. 4a shows one cross-section out of an acquired 3D MR dataset which covers the complete heart area and surrounding structures. An adequate TF is shown in FIG. 2, and the rendering that results from this TF is shown in FIG. 4b. Preferably, links are established between corresponding positions in the rendered image and the relevant cross-section of the 3D MR dataset. When the user indicates a position in the rendered image, on the basis of the link the corresponding position in the relevant cross section is shown (or vice versa). Thus, the user may identify an area that is suspected of a lesion, such as a stenosis, in the rendered image and may look for confirmation of the presence of a lesion in the relevant cross section (or vice versa).

Figure 5:
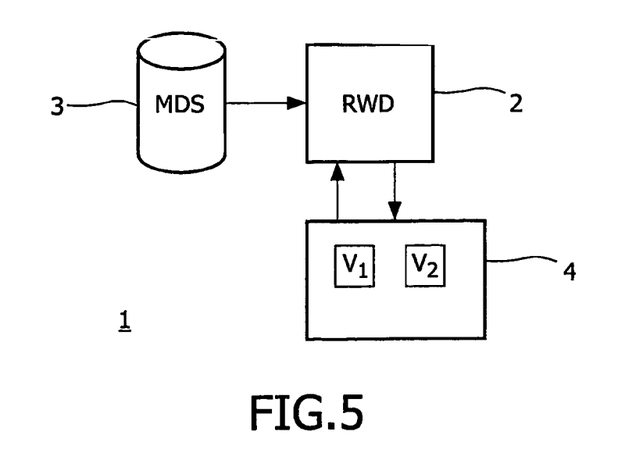
FIG. 5 shows a diagrammatic representation of a workstation in which the present invention is employed.

FIG. 5 shows a diagrammatic representation of a workstation in which the present invention is employed. The workstation 1 comprises a rendering system 2 which has access to the multi-dimensional dataset 3. The workstation 1 is provided with a user interface with a display screen that has several view ports V1, V2. On one view port the transfer function with the control sets in the form of definition points is shown. The user may adapt the transfer function by manipulating the definition points. Also the color settings at the boundaries of ranges of data-values may be user defined aided by the view port V1. The corresponding settings for the rendering process are applied to the rendering system 2. The rendering system performs a rendering process, such as direct volume rendering and supplies the rendered multi-dimensional dataset to the user interface to be displayed e.g. in one of the view ports. Notably different view ports are employed to display the transfer function and to display the rendered multi-dimensional dataset.

The invention claimed is:

1. A method for visualizing a multi-dimensional image dataset of voxels, comprising:
    obtaining a set of first inputs, each first input indicative of a different first voxel value range, and a set of second inputs, each second input indicative of an opacity value for a different one of the first voxel value ranges;
    obtaining a set of third inputs, each third input indicative of a second voxel value range, and a set of fourth inputs, each fourth input indicative of a different color value for a different one of the second voxel value ranges;
    visually displaying, with a display monitor, a gray translucent voxel value histogram with voxel values in a range covering the voxel values of the first voxel value range and the second voxel value range;
    visually displaying, with the display monitor, a color background, with the histogram overlaid there over, that includes the different color values, wherein a location of each of the color values, relative to the histogram, corresponds to the corresponding value of the second voxel value range, wherein positions where color values are defined along a histogram voxel value axis are displayed through user adjustable vertical indicator lines; and
    visually displaying, with the display monitor and over the histogram, an opacity map in a form of a polyline with nodes, where a location of each node, relative to the histogram, corresponds to the corresponding value of the first voxel value range and a height of each node corresponds to the corresponding opacity value of the first voxel value range, wherein the nodes are displayed through user adjustable node graphics;
    determining a transfer function, with a processor, for the voxel values based on a location of the visually displayed color values and opacity values with respect to the visually displayed histogram; and
    visually displaying, with the display monitor, the multi-dimensional image dataset of voxels based on the transfer function by displaying each voxel with a color value and an opacity value corresponding to the color value and the opacity value of the corresponding voxel value of the transfer function.

2. The method of claim 1, further comprising:
    receiving, in response to a change in a location of a user adjustable vertical indicator line, a second voxel value range change input indicative of the change in the location of the user adjustable vertical indicator line;
    changing the displayed second voxel value range for the corresponding color based on the change to the location of the user adjustable vertical indicator line; and
    updating the displayed multi-dimensional image dataset of voxels based on the change of the second voxel value range for the color.

3. The method of claim 2, further comprising:
    receiving, in response to a change in a location of a user adjustable node graphic, a first voxel value range change input indicative of the change in the location of the user adjustable node graphic;
    changing the displayed first voxel value range for the corresponding opacity based on the change to the location of the user adjustable node graphic; and
    updating the displayed multi-dimensional image dataset of voxels based on the change of the first voxel value range for the opacity.

4. The method of claim 3, further comprising:
    changing the first voxel value range for the opacity independent of the second voxel value ranges.

5. The method of claim 3, further comprising:
    changing the second voxel value range independent of the first voxel value ranges.

6. The method of claim 2, further comprising:
    receiving, in response to a change in a location of a user adjustable node graphic, an opacity change input indicative of the change in the location of the user adjustable node graphic;
    changing the displayed opacity for the corresponding first voxel value range based on the change to the location of the user adjustable node graphic; and
    updating the displayed multi-dimensional image dataset of voxels based on the change of the opacity.

7. The method of claim 6, further comprising:
    changing the opacity independent of the second voxel value ranges.

8. The method of claim 6, further comprising:
    changing the second voxel value range independent of the opacities.

9. The method of claim 2, further comprising:
    receiving, in response to a change in a location of a user adjustable node graphic, a first voxel value range change input indicative of the change in the location of the user adjustable node graphic and an opacity change input indicative of the change in the location of the user adjustable node graphic;
    changing the displayed first voxel value range and the opacity based on the change to the location of the user adjustable node graphic; and
    updating the displayed multi-dimensional image dataset of voxels based on the change of the first voxel value range for the opacity and the change of the opacity.

10. The method of claim 1, further comprising:
    adding a new first voxel value range to the first voxel value ranges in response to an input for the new first voxel value range;
    associating an opacity value to the new first voxel value range; and
    updating the displayed multi-dimensional image dataset of voxels based on the new first voxel value range.

11. The method of claim 1, further comprising:
    adding a new second voxel value range to the first voxel value ranges in response to an input for the new second voxel value range; and
    associating a color value to the new second voxel value range; and
    updating the displayed multi-dimensional image dataset of voxels based on the new second voxel value range.

12. The method of claim 1, further comprising:
    removing a first voxel value range from the first voxel value ranges in response to an input to remove the first voxel value range; and
    updating the displayed multi-dimensional image dataset of voxels based on the changed first voxel value range.

13. The method of claim 1, further comprising:
    removing a second voxel value range from the second voxel value ranges in response to an input to remove the second voxel value range; and
    updating the displayed multi-dimensional image dataset of voxels based on the changed second voxel value range.

14. The method of claim 1, further comprising:
    receiving an input to at least one of translate or stretch the first voxel value.

15. The method of claim 1, further comprising:
receiving an input to at least one of translate or stretch the second voxel value range an opacity.

16. A workstation to visualize a multi-dimensional image dataset, comprising:
a view port to display the multi-dimensional dataset;
an input device to receive the multi-dimensional dataset;
a processor, that executes a computer program, which causes the processor to:
  obtain a set of first inputs, each first input indicative of a different first voxel value range, and a set of second inputs, each second input indicative of an opacity value for a different one of the first voxel value ranges;
  obtain a set of third inputs, each third input indicative of a different second voxel value range, and a set of fourth inputs, each fourth input indicative of a different color value for a different one of the second voxel value ranges;
  visually display, via the view port, a gray translucent voxel value histogram with voxel values in a range covering the voxel values of the first voxel value range and the second voxel value range;
  visually display, via the view port, a color background, with the histogram overlaid there over, that includes the different color values, wherein a location of each of the colors, relative to the histogram, corresponds to the corresponding value of the second voxel value range and each color is visible independent of a height of the histogram, wherein positions where colors are defined along the histogram voxel value axis are displayed through user adjustable vertical indicator lines; and
  visually display, via the view port and over the histogram, an opacity map in a form of a polyline with nodes, where a location of each node, relative to the histogram, corresponds to the corresponding value of the first voxel value range and a height of each node corresponds to the corresponding opacity value of the first voxel value range, wherein the nodes are displayed through user adjustable node graphics;
  determine a transfer function, with a processor, for the voxel values based on a location of the visually displayed colors and opacities with respect to the visually displayed histogram; and
  visually display, via the view port, the multi-dimensional image dataset of voxels based on the transfer function by displaying each voxel with a color and an opacity corresponding to the color and the opacity of the corresponding voxel value of the transfer function.

17. The workstation of claim 16, further comprising:
changing an opacity value independent of the second voxel value ranges and the colors.

18. The workstation of claim 16, further comprising:
changing a first voxel value range independent of the second voxel value ranges and the colors.

19. The workstation of claim 16, further comprising:
changing, concurrently, an opacity value and a first voxel value range independent of the second voxel value ranges and the colors.

20. A non-transitory computer readable storage medium encoded with computer readable instructions, which, when executed by a processor of a computer, cause the processor to:
  obtain a set of first inputs, each first input indicative of a different first voxel value range, and a set of second inputs, each second input indicative of an opacity value for a different one of the first voxel value ranges;
  obtain a set of third inputs, each third input indicative of a different second voxel value range, and a set of fourth inputs, each fourth input indicative of a different color value for a different one of the second voxel value ranges;
  visually display, with a display monitor, a gray translucent voxel value histogram with voxel values in a range covering the voxel values of the first voxel value range and the second voxel value range;
  visually display, with the display monitor, a color background, with the histogram overlaid there over, that includes the different color values, wherein a location of each of the colors, relative to the histogram, corresponds to the corresponding value of the second voxel value range and each color is visible independent of a height of the histogram, wherein positions where colors are defined along the histogram voxel value axis are displayed through user adjustable vertical indicator lines; and
  visually display, with the display monitor and over the histogram, an opacity map in a form of a polyline with nodes, where a location of each node, relative to the histogram, corresponds to the corresponding value of the first voxel value range and a height of each node corresponds to the corresponding opacity value of the first voxel value range, wherein the nodes are displayed through user adjustable node graphics;
  determine a transfer function, with a processor, for the voxel values based on a location of the visually displayed colors and opacities with respect to the visually displayed histogram; and
  visually display, with the display monitor, the multi-dimensional image dataset of voxels based on the transfer function by displaying each voxel with a color and an opacity corresponding to the color and the opacity of the corresponding voxel value of the transfer function.

* * * * *